United States Patent [19]

Kameda et al.

[11] Patent Number: 5,762,863
[45] Date of Patent: Jun. 9, 1998

[54] METHOD OF PRODUCING CERAMIC MATRIX COMPOSITE MATERIAL

[75] Inventors: Tsuneji Kameda, Tokyo; Masahiro Asayama; Shoko Suyama, both of Yokohama, all of Japan

[73] Assignee: Kabushiki Kaisha Toshiba, Kawasaki, Japan

[21] Appl. No.: 552,952

[22] Filed: Nov. 3, 1995

Related U.S. Application Data

[62] Division of Ser. No. 279,162, Jul. 22, 1994, Pat. No. 5,510,303.

[30] Foreign Application Priority Data

Jul. 26, 1993 [JP] Japan ................................ 5-183913

[51] Int. Cl.$^6$ ................................................ C04B 35/577
[52] U.S. Cl. ........................ 264/640; 264/641; 264/647; 264/643; 419/11; 419/13; 501/92; 501/95.2; 501/95.3; 501/97.4
[58] Field of Search ....................... 501/88, 89, 92, 501/95, 97, 95.2, 95.3, 97.4; 264/60, 640, 641, 647, 643; 419/11, 13

[56] References Cited

U.S. PATENT DOCUMENTS

| | | | |
|---|---|---|---|
| 2,636,826 | 4/1953 | Nicholson . | |
| 4,238,433 | 12/1980 | Hillig | 264/60 |
| 4,532,091 | 7/1985 | Dias et al. | 264/60 |
| 4,919,868 | 4/1990 | Huang . | |
| 4,937,211 | 6/1990 | Washburn . | |
| 4,981,632 | 1/1991 | Claar et al. | 264/60 |
| 5,134,097 | 7/1992 | Niihara et al. . | |

FOREIGN PATENT DOCUMENTS

| | | |
|---|---|---|
| 0 249 130 | 12/1987 | European Pat. Off. . |
| 0 412 428 | 2/1991 | European Pat. Off. . |
| 61-291460 | 12/1986 | Japan . |
| 1167277 | 6/1989 | Japan . |
| 45006251 | 6/1989 | Japan . |
| 2 066 800 | 7/1981 | United Kingdom . |

OTHER PUBLICATIONS

"X-Ray Photoelectron Spectroscopy of In-Situ Fractured Reaction Bonded Silicon Nitride", Donley et al., Mat. Res. Soc. Symp. Proc., vol. 60, pp. 489–497, 1986.

"Silicon Nitride and Carbide Produced From Rice Husk", Azuma et al., Proceedings of the Annual Meeting of The Ceramic Society of Japan, p. 377, 1990.

William R. Moser, et al., "Kinetics Of Iron-Promoted Silicon Nitridation" Journal of Materials Research, vol. 1, No. 4, Aug. 1986, pp. 797–802.

*Primary Examiner*—James Derrington
*Attorney, Agent, or Firm*—Finnegan, Henderson, Farabow, Garrett & Dunner, L.L.P.

[57] ABSTRACT

A ceramic matrix composite material comprising a matrix containing silicon carbide as the primary component and silicon nitride as the secondary component is disclosed. The silicon nitride includes not more than 1% by weight of iron and reinforcements mixed and dispersed. The ceramic matrix composite material is manufactured, for example, by forming a matrix containing reaction sintered silicon carbide as the primary component and nitriding the free metal silicon produced in the sintering process so that the free metal silicon will be converted to fine silicon nitride particles. Said metal silicon used for reaction sintering already contains iron. These processes enable the containing of a comparatively large amount of reinforcements, as well as the improvement of heat resistance of the sintered compact and the suppression of the deterioration of reinforcements.

8 Claims, 2 Drawing Sheets

METHOD OF PRODUCING CERAMIC MATRIX COMPOSITE MATERIAL

This is a divisional of application Ser. No. 08/279,162, filed Jul. 22, 1994, now U.S. Pat. No. 5,510,303.

BACKGROUND OF THE INVENTION

1. Field of the Invention

The present invention relates to a ceramic matrix composite material, the matrix of which primarily consists of silicon carbide, and a manufacturing method thereof.

2. Description of the Related Art

Since silicon carbide (SiC) sinters are hard and resist abrasion, heat, oxidation, and alkaline well, many attempts have been made to apply the materials to slide members, turbine blades, reaction tubes, or sensor boxes used under severe conditions.

However, ceramic materials consisting of silicon carbide sinters are brittle; they are typically destroyed catastrophically under a tensile stress. It is strongly sought to increase the toughness and reliability of these materials in order to improve the reliability of SiC ceramic parts. Much research is being carried out on ceramic matrix composite materials where SiC ceramics are used as matrices in which continuous fibres, short fibres or whiskers of ceramics are compounded and dispersed.

An example of a conventional method of producing a ceramic matrix composite material is described herein. Short fibres or whiskers of ceramics are mixed with SiC powder to be used as a matrix, or a preformed compact made of continuous ceramic fibres is filled with SiC powder to create a compact including reinforcements. As is the usual way to manufacture sintered masses, either normal sintering, gas pressurized sintering, hot pressing, or hot isostatic pressing is used to sinter the shaped compact including reinforcements. Among these sintering methods, hot pressing and hot isostatic pressing are commonly used because normal sintering and gas pressurized sintering fail to provide dense sinter when a lot of reinforcement is added.

Sintering by hot pressing and hot isostatic pressing, however, has the degradation problem with reinforcements at high temperature and high pressure. Moreover, in the hot pressing method, part's shapes are to be simple.

Meanwhile, attempts are being made to use reaction sintered SiC as a matrix for ceramic based composite material. In reaction sintering, the dimension change due to sintering occurs less, a dense compact can be manufactured at a comparatively low temperature and low pressure which enables a large amount of reinforcement to be compounded in. On the other hand, conventional reaction sintering cannot fully prevent free metal (metal silicon) from remaining in the matrix. Sections occupied by free metals work in the same way as pores do at high temperature. The ceramic based composite material using a matrix of reaction sintered SiC, therefore, has a problem with strength at high temperatures.

Moreover, methods using synthetic organic precursors or chemical vapor infiltration (CVI) to form a matrix made of SiC are being tested. However, because a matrix manufactured with synthetic organic precursors has an amorphous structure containing much oxygen, the strength of the compact drops at high temperature. The CVI method also has other problems, among them the density of the manufactured compact being rather low and manufacturing and equipment costs high.

As stated above, conventional ceramic matrix composite materials using matrices of SiC have several problems including deterioration in reinforcement, limited part's shapes, and density of the sinter.

Thus a strong demand exists for the technology to produce a dense matrix which fully utilizes the characteristics of a SiC matrix benefiting from the effects of fibres, whiskers and other forms of ceramics, which allows a composite of comparatively large amounts of reinforcement and prevents the deterioration of reinforcements.

SUMMARY OF THE INVENTION

It is, therefore, an object of this invention to provide a strong and reliable ceramic matrix composite material with a matrix comprising SiC as a primary component, preventing a decrease in the density of sinter and the deterioration of reinforcements, as well as allowing a composite of comparatively large amounts of reinforcements. It is also an object of this invention to provide a sufficient method of producing the ceramic matrix composite material repeatedly.

The ceramic matrix composite material of the present invention comprises a matrix using silicon carbide as the primary component and silicon nitride as the secondary component, the silicon nitride containing not more than one percent by weight of iron and reinforcements mixed and dispersed in said matrix.

The method of producing the ceramic matrix composite material of the present invention comprises: 1. a step of manufacturing a mixed compact with a starting material for reaction sintered silicon carbide containing carbon component and reinforcements, 2. a step of manufacturing a composite reaction sinter with a matrix composed of reaction sintered silicon carbide by applying a heat treatment to the mixed compact containing reinforcements in an atmosphere including metal silicon containing iron, and 3. a step of nitriding the free metal silicon contained in the composite reaction sinter to convert it into silicon nitride by applying a heat treatment to the composite reaction sinter in an atmosphere including nitrogen.

DESCRIPTION OF THE PREFERRED EMBODIMENTS

This invention will be now described more specifically below with reference to working examples thereof.

Figure 1:
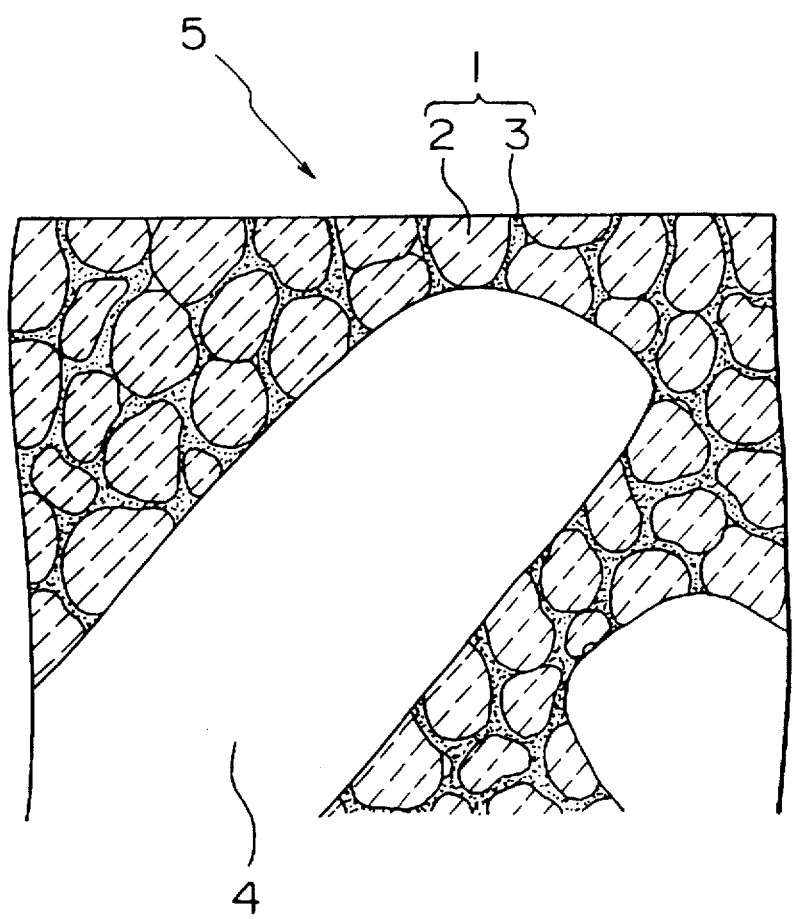
FIG. 1 shows schematic sketch for the micro-structure of a ceramic based composite material embodied in the present invention.

FIG. 1 illustrates a micro-structure of a ceramic matrix composite material as one embodiment of the present invention. In this diagram, 1 stands for a matrix of ceramic matrix composite material. Matrix 1 comprises silicon carbide (SiC) 2 as the primary component and silicon nitride ($Si_3N_4$) 3 as the secondary component which exists, for example, in the grain boundary of SiC 2. The $Si_3N_4$ phase 3 contains not more than 1% by weight of iron. Matrix 1 composes of SiC 2 and $Si_3N_4$, wherein reinforcements 4 are compounded and dispersed, and all of these components comprise the ceramic matrix composite material 5.

In the case of using reaction sintered SiC as a matrix for the ceramic matrix composite material, free metal Si remains in the composite sinter that contains reinforcements. In the present invention, said free metal silicon is nitrided to become $Si_3N_4$ and the $Si_3N_4$ is filled in and around the grain boundary of SiC. This process increases ceramic matrix density, strength and various kinds of resistance including heat resistance of the composite sinter. However, simple nitriding of free metal silicon takes a long time and is difficult to accomplish homogeneous nitriding at the core of the sinter.

In the present invention, metal silicon should contain iron before nitriding to improve the homogeneity of the resulting $Si_3N_4$ and to shorten the nitriding time. Iron manifests two effects; one is that it promotes nitriding of metal silicon and the other is to produce finer $Si_3N_4$ particles. The amount of iron in the metal silicon is to be calculated so as to have iron content in the $Si_3N_4$ phase not more than one percent by weight after sintering. In the present invention, it is important to have not more than one percent by weight of said iron content in the $Si_3N_4$ phase.

When more than one percent by weight of iron exists in the $Si_3N_4$ phase, the characteristics of $Si_3N_4$ are weakened. Among other problems, there is a decrease in the strength of the composite sinter because bulky $Si_3N_4$ particles are produced. When iron in $Si_3N_4$ phase is not more than one percent by weight, the average diameter of $Si_3N_4$ particles to be produced can be as fine as at most 1.0 μm. With such fine $Si_3N_4$ particles, characteristics of $Si_3N_4$ phase, including strength, can be further improved.

However, when iron content in the $Si_3N_4$ phase is too low, said effect is not produced. Here, it is desirable, therefore, to add iron to said silicon before the nitriding process and ensure iron content in the $Si_3N_4$ phase to be not less than 0.05% by weight. A more desirable iron content is from 0.1 to 1% by weight, with an even further desirable content from 0.2 to 1% by weight. With these iron contents, the average diameter of the resulting $Si_3N_4$ particles is at most 0.5 μm.

Since the $Si_3N_4$ particles 3 in the matrix 1 are made from the free metal silicon remaining as mentioned above, during the nitriding process which is carried out after the reaction sintering of SiC 1, the amount of $Si_3N_4$ cannot be limited. Considering the characteristics of the matrix 1 having SiC 2 as the primary component, it is desirable to adjust the volume percentage of $Si_3N_4$ 3 in the matrix 1 to be from about 3 to about 30 percent.

$Si_3N_4$ 3 in matrix 1, however, is not necessarily produced by nitriding the free metal silicon which remains after the reaction sintering of SiC. Therefore, it is possible, for example, to separately nitride the silicon containing iron impregnated into the composite sinter with a matrix composed of SiC.

Various materials can be utilized as a reinforcement 4 to be compounded and dispersed in the matrix 1: long fibres, short fibres, whiskers, platelets, and particles; e.g. C fibres, SiC fibres, SiC coated fibres (with a core-wire of, for example, carbon), Si—C—O fibres, Si—Ti—C—O fibres, $Si_3N_4$ fibres, $Si_3N_4$ coated fibres (with a core-wire of, for example, carbon), $Al_2O_3$ fibres, $ZrO_2$ fibres, SiC whiskers, $Si_3N_4$ whiskers, $Al_2O_3$ whiskers, $ZrO_2$ whiskers and so forth.

The desirable volume ratio for such fibrous materials including fibres and whiskers of ceramics to be used as the reinforcements 4 is from about 20 to 75% of the composite material (composite sintered compact). When SiC 2 in the matrix 1 is formed by a method other than reaction sintering, it is desirable to decrease the amount of reinforcement 4 to be compounded to not more than 50% by volume. When compounding particles or platelets as the reinforcement 4, the preferable volume percentage is almost the same. When reaction sintered SiC is chosen as the primary component of the matrix 1, a larger amount of reinforcement 4 can be compounded.

Further, a method using $Si_3N_4$ as a binding material for SiC sinter has already been disclosed. For example, the specification of U.S. Pat. No. 4,937,211 describes a refractory using $Si_3N_4$ as a binding material for SiC particles. Said refractory, however, does not contain reinforcements including ceramic fibres, and sintering of SiC itself is conventional normal sintering. Neither does the specification of U.S. Pat. No. 4,937,211 suggest the effect of using reaction sintered SiC as a matrix of a ceramic matrix composite material. Moreover, although the binding material of $Si_3N_4$ in said refractory contains iron oxide thereat, the specification does not suggest the function of metal iron to provide finer $Si_3N_4$ particles. It is clearly noted from these facts that the present invention departs from and distinguishes from the prior art.

Referring now to FIG. 2, the producing process of said ceramic matrix composite material is illustrated.

Firstly, a starting material that consists of a mixture of carbon powder and SiC filler is prepared to make reaction sintered SiC which is to be the primary component of the matrix. Reinforcements can be utilized thereat as filler. When reinforcements are utilized as filler, a larger amount for reinforcements can be compounded. The maximum amount of reinforcements that can be compounded in is, for example, about 75% by volume.

The mixed compact is manufactured by mixing the starting material for reaction sintered SiC at a desired composition and the reinforcements then shaping at a desired shape. For example of forming, there are two other methods; one is to prepare preforms with fibrous reinforcements and then fill the starting material, and the other is to arrange reinforcing fibres in forming mold and then fill the starting material. As for the forming process, slip casting, mold pressing and other well-known prior methods can be applied. However, it is desirable to use methods such as pressure slip casting, which can improve filling rates without doing mechanical damage to the reinforcements.

Figure 2A:
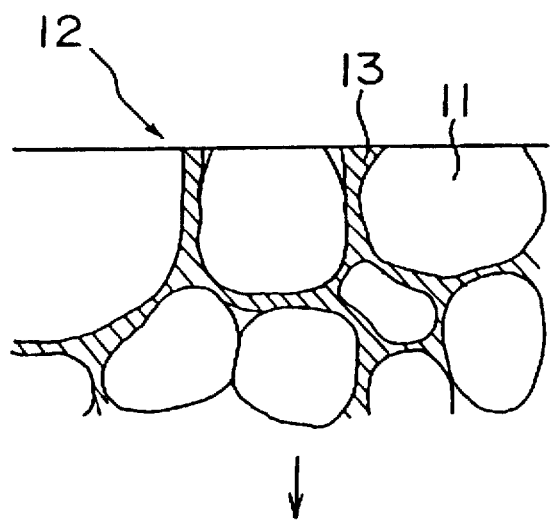
FIG. 2 shows a producing process provided in accordance with the producing method of the present invention.

Secondly, said mixed compact is converted to a composite reaction sinter 12 having a matrix made of reaction sintered SiC through heat treatment in the atmosphere including metal silicon as shown in FIG. 2a. In FIG. 2, the illustration of the reinforcements is omitted. Here, the metal silicon used for reaction sintering contains iron. The form of the iron added to the metal silicon includes metal powder and Fe alloy powder such as Si—Fe alloy. The amount of iron to be added should be calculated not more than one percent by weight in the $Si_3N_4$ phase of the composite as described above.

Figure 2B:
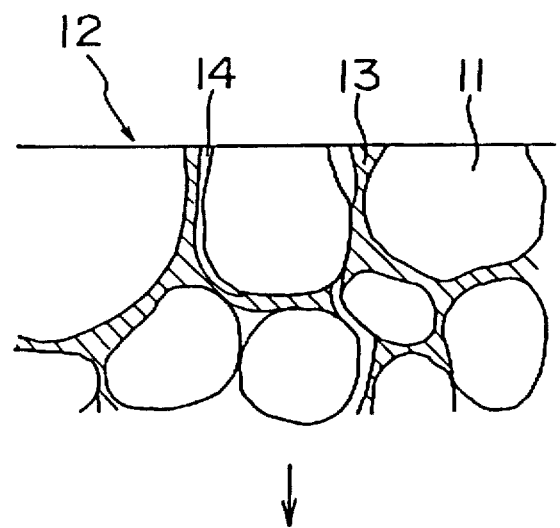

In the composite reaction sinter 12 produced by the reaction sintering method, free metal silicon 13 remains around the SiC 11 as shown in FIG. 2a. To nitride the free metal silicon 13 thereupon, heat treatment is carried out in the atmosphere including nitrogen on the composite reaction sinter 12. Prior to this nitriding process it is preferable to apply the heat treatment to the composite reaction sinter 12 at reduced pressure to vaporize part of the free metal silicon 13 and to form open pores 14 as shown in FIG. 2b. Said heat treatment enables homogeneous nitriding to the core of the free metal silicon 13.

Figure 2C:
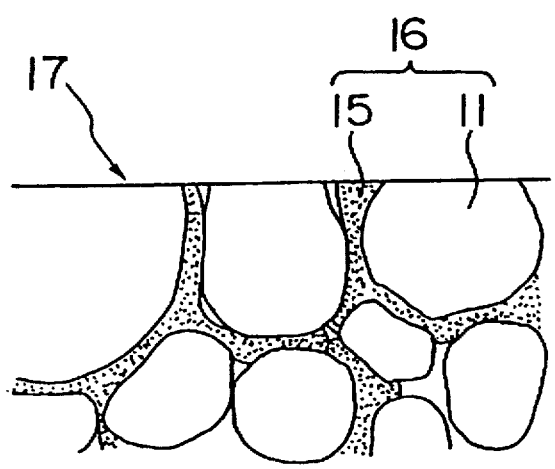

Heat treatment in the atmosphere including nitrogen is carried out on the composite reaction sinter 12 thereon. It is desirable to continue heat treatment at the temperature of, for example, from 1380° to 1400° C. for about five to ten hours, depending upon the part's size and shape. Through said nitriding heat treatment, the free metal silicon 13 is converted to silicon nitride particles 15 as shown in FIG. 2c. Thus, a matrix 16 containing SiC 11 as the primary component and $Si_3N_4$ 15 as the secondary component is obtained.

In FIG. 2, wherein the illustration of the reinforcements is omitted, the reinforcements are compounded and dispersed in the matrix 16 containing SiC 11 and $Si_3N_4$ 15 as shown in FIG. 1. Thus, an objected ceramic matrix composite material 17 containing reinforcements is obtained.

As described above, by using the reaction sintered SiC capable of being sintered at lower temperature with almost no shrinkage as the primary component of the ceramic matrix composite material 17, the deterioration and the degradation of fibrous reinforcements is suppressed. Further, by nitriding the free metal silicon 13, which inevitably remains in the reaction sintered SiC, heat-resistance is improved, and the fracture energy of the ceramic matrix composite material 17 increases reproducibly. Moreover, the low iron content in $Si_3N_4$ 15, not more than one percent by weight, contributes to produce fine $Si_3N_4$ particles 15, which further increase the strength of the ceramic matrix composite material 17.

Because the matrix 16 shrinks less at sintering, the produced ceramic matrix composite is near net shape to the object product and the cost of further treatment is decreased. Moreover, by adopting the reaction sintered SiC 11 as the primary component of the matrix 16, reinforcements can be used as filler and a higher percentage of reinforcements can be compounded.

Further, the ceramic matrix composite materials of the present invention can be manufactured using other methods including the following:

Firstly, a mixed compact including SiC powder and reinforcements is manufactured. For the mixing and compacting SiC and the reinforcements, the manufacturing method described above can be applied, while preparation of the powder and compacting techniques are arranged so that a porous compact is produced after sintering.

Secondly, sintering of said mixed compact is carried out to produce porous composite sinter. It is desirable to apply either a normal sintering method or a gas pressurized sintering method thereat. Then, metal silicon containing iron is impregnated in said porous composite sinter. The amount of iron to be added is to be the same as in said producing method. For impregnation, pressurized slurry which contains silicon powder penetrating method is applied. In this method, burn out process of the added organic binders in the slurry is also applied to form pores. To ensure the making of permeable pores, it is also possible to adjust the amount of slurry to be impregnated.

Then, heat treatment in an atmosphere including nitrogen is carried out for nitriding on the porous composite sinter impregnated by said metal silicon. This nitriding process produces the ceramic based composite material containing reinforcements compounded and dispersed. Said nitriding is done under the similar condition to that of the producing method mentioned above.

Thus, through the impregnation and nitriding processes of the metal silicon after preparing composite sinter with a matrix composed of porous SiC sinter, a larger amounts of reinforcements can be compounded, the deterioration of said reinforcements can be repressed, resulting in the production of a dense composite material. Furthermore, for a matrix, it is better to adopt reaction sintering process so as to increase the amount of reinforcements to be compounded.

The following are working examples of embodiments and evaluations of said ceramic based composite material.

EXAMPLE 1

SiC continuous fibres (Dia: 14 mm) were utilized as reinforcements here. With said SiC continuous fibres, a preform was formed to be a part shape, wherein 30% by volume of SiC continuous fibres existed after sintering. Then, 30% by volume carbon powder and 70% by volume SiC powder were mixed in water to prepare a slurry containing 50% by volume of said mixture as a starting material for reaction sintered SiC.

Said preform containing reinforcements was set in a resin mold in a pressure casting machine, on which said slurry was filled at the pressure of approximately 30 kg/m² to produce a mixed compact containing the fibres. Said mixed compact was arranged on a carbon crucible containing metal silicon powder of 1.2 times as much as the total silicon amount necessary for the siliciding of said mixed compact. Then the compact was heated at a temperature of 1420° C. for two hours in the vacuum atmosphere so that the impregnation of melted Si and the reaction sintering of the mixed compact could be carried out. To said silicon powder, 0.5% by weight of metal iron had already been added. The silicon powder also contained 400 ppm iron as an impurity. The resulting composite sinter contained 15% by weight of free metal silicon in its matrix.

Said composite sinter was processed with heat treatment under reduced pressure, $1\times10^{-2}$ Pa, at 1450° C. for 30 minutes so that part of the free metal silicon was vaporized and open pores were formed. After the heat treatment, 10% by volume of free metal silicon existed in the matrix of the composite sinter.

Further, having said heat treatment completed, the composite sinter went through nitriding heat treatment in the nitrogen atmosphere with $1\times10^5$ Pa at the temperature of 1400° C. for 5 hours. The obtained matrix of the composite sinter containing continuous fibres was composed of about 85% by volume of reaction sintered SiC, 11% by volume of $Si_3N_4$, 1% by volume of free metal silicon and 3% by volume of pores. The volume percentage of continuous fibres contained in the composite sinter was, as mentioned above, 30% by volume. The average particle diameter of $Si_3N_4$ particles in the composite sinter was 0.2 μm.

The density of said composite sintered compact containing continuous fibres was measured. Using test pieces 10×4×40 mm cut off from the composite sintered compact, three-point bending strength and fracture toughness were also measured both at normal temperature and at 1300° C. The obtained values were 2.8 g/m³ for density, 320 MPa for three-point bending strength at normal temperature, 300 MPa for three-point bending strength at 1300° C., and 15 MPa m$^{1/2}$ for fracture toughness.

COMPARATIVE EXAMPLE 1

The composite sinter containing continuous fibres was manufactured under the same condition as in said Example 1 except that iron was not added to the metal silicon powder (although containing 400 ppm iron as an impurity). The matrix of this composite sinter was composed of 85% by volume of reaction sintered SiC, 2% by volume of $Si_3N_4$, 10% by volume of free metal silicon and 3% by volume of pores. Moreover, the characteristics of this composite sinter containing continuous fibres were measured and evaluated in the same manner as in Example 1. The obtained values were 2.7% g/cm³ for density, 170 MPa for three-point bending strength at normal temperature, 100 MPa for three-point bending strength at 1300° C., and 7 MPa m$^{1/2}$ for fracture toughness.

COMPARATIVE EXAMPLE 2

The composite sinter containing continuous fibres was produced under the same condition as in Example 1 except the heat treatment under reduced pressure and the nitriding heat treatment. The characteristics of this composite sinter containing continuous fibres were measured and evaluated in the same manner as in Example 1. The obtained values were 2.9 g/cm³ for density, 370 MPa for three-point bending strength at normal temperature, 120 MPa for three-point bending strength at 1300° C., 11 MPa m$^{1/2}$ for fracture toughness. This composite sinter containing continuous fibres decreased strength at high temperatures. It observed that a part of melting metal silicon appeared on the surface of composite sinter.

COMPARATIVE EXAMPLE 3

The composite sinter containing continuous fibres was produced under the same condition as in Example 1 expect that 3.0% by weight of metal iron had been added to the metal silicon powder. The matrix of this composite sinter was composed of 85% by volume of reaction sintered SiC, 9% by volume of $Si_3N_4$, 3% by volume of free metal silicon, 3% by volume of pores. Moreover, the characteristics of this composite sinter containing continuous fibres were measured and evaluated in the same manner as in Example 1. The obtained values were 2.7 g/cm$^3$ for density, 180 MPa for three-point bending strength at normal temperature, 150 MPa for three-point bending strength at 1300° C., 12 MPa m$^{1/2}$ for fracture toughness.

EXAMPLES 2–6

The composite sinters containing reinforcements with the percent compositions shown in TABLE 1 was manufactured in the same manner as in Example 1. The reinforcements used thereat are shown respectively in TABLE 1.

TABLE 1

|  |  | Matrix (volume ratio, %) | | | | Fe content in Si (wt %) | Reinforcement | |
|---|---|---|---|---|---|---|---|---|
|  |  | SiC | $Si_3N_4$ | Free Si | Pores |  | Types | Amount (vol %) |
| Exam- | 2 | 70 | 24 | 1 | 5 | 0.5 | SiC continuous fibers | 30 |
| ple | 3 | 70 | 19 | 4 | 7 | 0.1 | SiC continuous fibers | 30 |
|  | 4 | 85 | 10 | 1 | 4 | 0.5 | SiC continuous fibers | 20 |
|  | 5 | 70 | 23 | 2 | 5 | 0.2 | SiC whiskers | 20 |
|  | 6 | 85 | 11 | 1 | 3 | 0.5 | SiC whiskers | 30 |

The characteristics of the composite sintered compact containing reinforcements were measured and evaluated as in Example 1. The obtained values are shown in the TABLE 2 hereafter.

TABLE 2

|  |  |  | Three-point bending strength (MPa) | | Fracture toughness (Mpa m$^{1/2}$) |
|---|---|---|---|---|---|
|  |  | Density (g/cm$^3$) | Normal Temp. | 1300° C. |  |
| Exam- | 2 | 2.7 | 270 | 250 | 13 |
| ple | 3 | 2.6 | 210 | 190 | 14 |
|  | 4 | 2.7 | 290 | 280 | 11 |
|  | 5 | 2.6 | 240 | 200 | 9 |
|  | 6 | 2.8 | 320 | 300 | 10 |

As can be seen in the data of TABLE 2, in the composite sinter containing reinforcements almost all of the free metal silicon was converted to $Si_3N_4$, in which both strength and fracture toughness were notably improved. Thus, strong and reliable SiC based composite material especially suited, for example, to slide members or hot sections, is provided.

EXAMPLES 7–10

Under the conditions shown in TABLE 3, the heat treatment under reduced pressure and the nitriding heat treatment were carried out respectively on to the composite sinters produced in the same manner as in Example 1 to manufacture the composite sinters containing reinforcements. The characteristics of the composite sintered compact containing reinforcements were measured and evaluated as in Example 1. The obtained values are shown in TABLE 4 hereafter.

TABLE 3

|  |  | Heat treatment under reduced pressure | | | Nitriding heat treatment | | |
|---|---|---|---|---|---|---|---|
|  |  | pressure (Pa) | temp. (°C.) | time (h) | pressure (Pa) | temp. (°C.) | time (h) |
| Example | 7 | $1 \times 10^{-2}$ | 1450 | 5 | $1 \times 10^5$ | 1400 | 5 |
|  | 8 | $1 \times 10^{-2}$ | 1450 | 0.5 | $1 \times 10^5$ | 1400 | 25 |
|  | 9 | $1 \times 10^{-2}$ | 1450 | 5 | $9.8 \times 10^5$ | 1400 | 5 |
|  | 10 | $1 \times 10^{-2}$ | 1450 | 0.5 | $9.8 \times 10^5$ | 1400 | 25 |

TABLE 4

|  |  | Compositions | | | | | Characteristics | | | |
|---|---|---|---|---|---|---|---|---|---|---|
|  |  | Matrix (volume ratio, %) | | | | SiC continuous fibres amount (vol %) | Density (g/cm$^3$) | Three point bending strength (MPa) | | Fracture toughness (MPam$^{1/2}$) |
|  |  | SiC | $Si_3N_4$ | Free Si | Pores |  |  | Normal Temp. | 1300° C. |  |
| Example | 7 | 85 | 6 | 1 | 8 | 30 | 2.6 | 260 | 250 | 13 |
|  | 8 | 85 | 11.5 | 0.5 | 3 | 30 | 2.8 | 340 | 300 | 15 |
|  | 9 | 85 | 6.9 | 0.1 | 8 | 30 | 2.6 | 270 | 260 | 13 |
|  | 10 | 85 | 11.9 | 0.1 | 3 | 30 | 2.8 | 340 | 320 | 15 |

EXAMPLE 11

Firstly, a preform of a part shape consisting of SiC continuous fibres was manufactured in the same manner as in Example 1 and using the same reinforcements as in Example 1. And as a starting material for the matrix, SiC powder (containing 1% by weight of B and 2% by weight of C as sintering additives) was prepared, out of which slurry material containing 40% by volume SiC powder was produced.

Secondly, said preform made with reinforcements were arranged in a resin mold in the pressure casting machine, over which said slurry material was filled under a pressure of 3 MPa to make a compact containing continuous fibres. Then the compact was sintered in an argon atmosphere at a temperature of 1400° C. for two hours. The porous composite sintered compact obtained thereat had 30% by volume pores.

The next process was the impregnation of metal silicon in a slurry form prepared from metal silicon powder of 1 μm in diameter on average by the pressure casting method in the same manner as described above. Iron content in Si was 0.5% by weight.

Said impregnated composite sintered compact underwent the nitriding heat treatment in a nitrogen atmosphere at normal atmospheric pressure at 1400° C. for 10 hours. The matrix of thus obtained composite sinter containing continuous fibres was composed of 57% by volume of SiC, 31% by volume of $Si_3N_4$, 1% by volume of metal silicon and 11% by volume of pores. The characteristics of this composite sinter containing continuous fibres were measured and evaluated in the same manner as Example 1. The obtained values were 2.4 g/cm$^3$ for density, 200 MPa for three-point bending strength at normal temperature, 170 MPa for three-point bending strength at 1300° C., and 13 MPa m$^{1/2}$ for fracture toughness.

The foregoing examples show that the ceramic matrix composite material of the present invention can make a major improvement in the density of sinter, provided that a comparatively large amount of reinforcements are compounded in and deterioration of the reinforcements is suppressed. A ceramic matrix composite material thus can be provided, having a more toughness and more reliable SiC as the primary component of the matrix. Such ceramic based composite material is suitable to slide members and hot sections.

What is claimed is:

1. A method of producing a ceramic matrix composite material comprising:
   - a first step of preparing a mixed compact including a starting material for forming reaction sintered silicon carbide containing a carbon component and reinforcements;
   - a second step of preparing a composite reaction sinter having a first matrix comprising said reaction sintered silicon carbide phase and elemental silicon by applying a heat treatment to said mixed compact in an atmosphere including elemental silicon in which iron is added, wherein said reaction sintered silicon carbide phase is a primary component of said first matrix; and
   - a third step of nitriding said elemental silicon in said first matrix of said composite reaction sinter to form said silicon nitride phase composed of silicon nitride particles having an average diameter of 1 μm or less, by applying heat treatment to said composite reaction sinter in an atmosphere including nitrogen, wherein an amount of iron in the silicon nitride phase is not more than 1% by weight and said silicon nitride phase is a secondary component of said first matrix.

2. The method of producing a ceramic matrix composite material as claimed in claim 1, wherein said silicon nitride particles have an average diameter of 0.5 μm or less.

3. The method of producing a ceramic matrix composite material as claimed in claim 1, wherein said reinforcements contain at least one element selected from the group consisting of continuous fibres, short fibres, whiskers, particles and platelets.

4. The method of producing a ceramic matrix composite material as claimed in claim 1, wherein said reinforcements are dispersed in said composite material in an amount of 20 to 75% by volume.

5. The method of producing a ceramic matrix composite as claimed in claim 1, wherein said silicon nitride phase contains 0.05 to 1.0% by weight of iron.

6. A method of producing a ceramic matrix composite material comprising:
   - a first step of preparing a mixed compact including a starting material for forming reaction sintered silicon carbide containing a carbon component and reinforcements;
   - a second step of preparing a composite reaction sinter having a first matrix comprising said reaction sintered silicon carbide phase and elemental silicon by applying a heat treatment to said mixed compact in an atmosphere including elemental silicon in which iron is added, wherein said reaction sintered silicon carbide phase is a primary component of said first matrix and said reinforcements are dispersed in said matrix in an amount of 20 to 75% by volume; and
   - a third step of nitriding said elemental silicon in said first matrix of said composite reaction sinter to form said silicon nitride phase composed of silicon nitride particles by applying heat treatment to said composite reaction sinter in an atmosphere including nitrogen, wherein an amount of iron in the silicon nitride phase is not more than 1% by weight and said silicon nitride phase is a secondary component of said first matrix.

7. The method for producing a ceramic matrix composite material as claimed in claim 6, wherein said reinforcements include at least one reinforcement selected from the group consisting of continuous fibres, short fibres, whiskers, particles and platelets.

8. The method of producing a ceramic matrix composite material as claimed in claim 6, wherein said silicon nitride phase contains 0.05 to 1.0% by weight of iron.

* * * * *